Patented Nov. 30, 1948

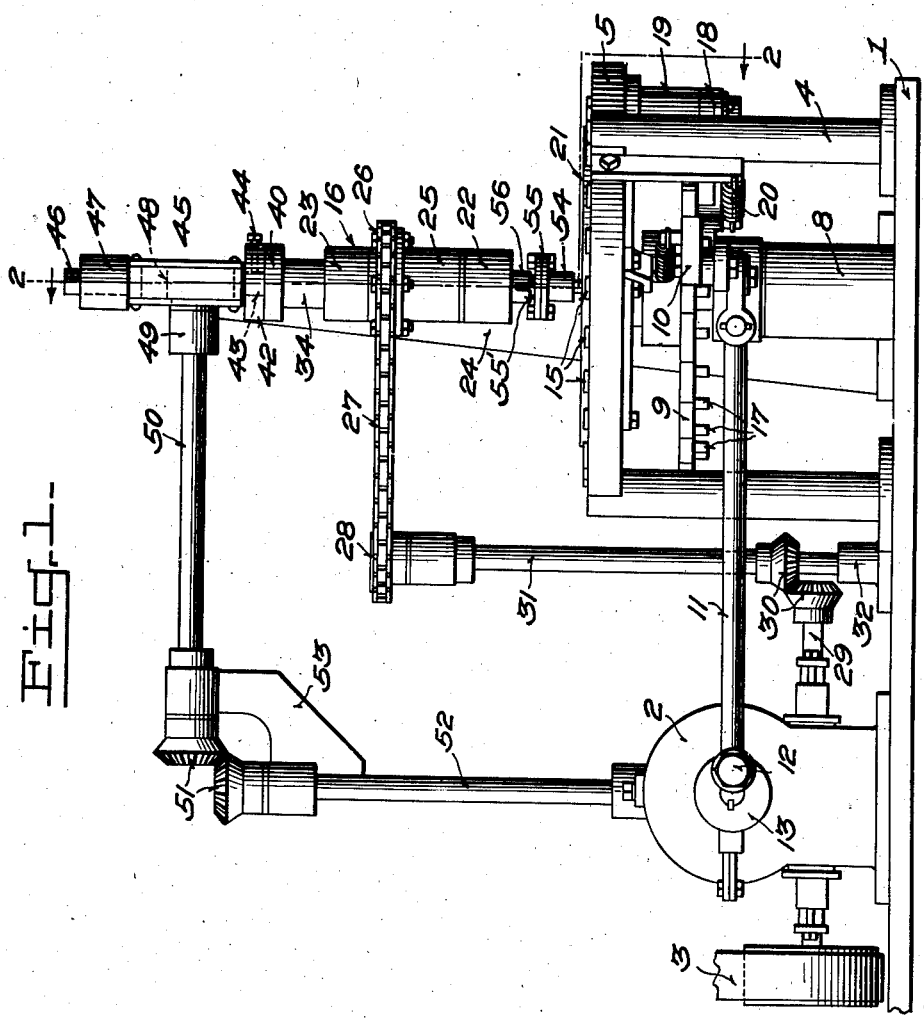

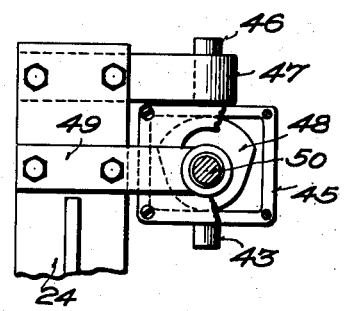
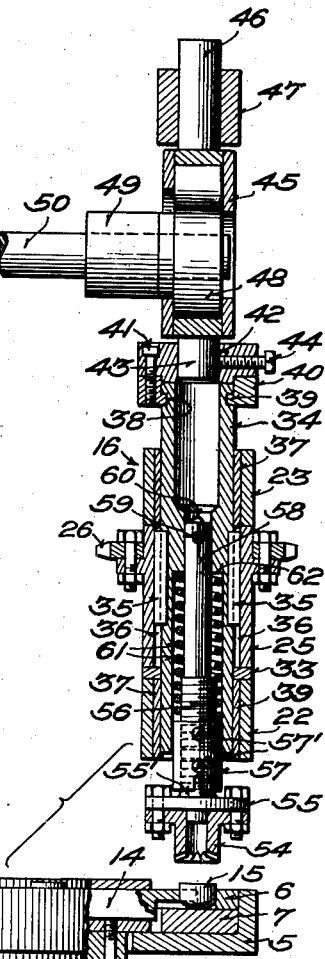

2,454,764

UNITED STATES PATENT OFFICE 2,454,764

MILLING TOOL

Harvey M. Braucher, Baltimore, Md.

Application September 11, 1946, Serial No. 696,327

3 Claims. (Cl. 90—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in milling tools, particularly tools for processing the ends of cartridge cups.

An object of the present invention is to provide a milling tool for operation as part of a semi-automatic machine which feeds cartridge cups to the tool and rigidly clamps them in position while the open end of each cup is milled by the tool to reduce the cup to a definite length.

The present invention is intended for use in, but not necessarily limited to, the device shown in application Serial No. 549,243, filed August 12, 1944, for Milling machine, of which the present application is a continuation-in-part.

Other advantages and objects will be apparent from the following description of the drawings wherein:

Figure 1 is a side elevational view of the milling machine,

Figure 2 is a view taken on the line 2—2 of Figure 1, and

Figure 3 is an elevational view of the cam mechanism for reciprocating the milling tool.

A base 1 carries a gear casing 2 housing reduction gearing driven by a primer mover, not shown, through a belt 3. Standards 4, carried by the base 1, support a stationary housing 5 which surrounds a work table 6 slidable over an annular ring support 7 secured to the housing 5. The work table 6 is rotatably mounted upon a pedestal 8 and intermittently driven by a ratchet 9, keyed to the work table 6, and a pawl 10 rotatable about the pedestal 8 and actuated by a connecting rod 11 pivoted upon a wrist pin 12 carried by a crank disk 13 driven by the reduction gearing housed within the casing 2.

The work table 6 is provided with slots in which are slidable clamp members 14 for gripping a cartridge cup 15 to rotate the same over the annular ring support 7 to position the cartridge cup under a milling tool, indicated generally by the reference numeral 16.

To bring each cartridge cup to a stop directly under the milling tool, studs 17, equally spaced about the ratchet 9 and corresponding to the pockets in the work table 6, are engaged by an indexing arm 18 pivoted on the depending bracket 19 (Fig. 1, bolted to the underside of the housing 5 and urged into engagement with the studs 17 by a tension spring 20.

A table 21 is mounted on the pedestal 8 for receiving a supply of cartridge cups from which they are placed in the slots of the work table 6 to be held therein by the clamp member 14.

Further details of the machine are given in the application Serial No. 549,243, of which this application is a continuation-in-part.

The milling tool 16 is slidably and rotatably supported in aligned bearings 22 and 23 secured to an upstanding support 24 attached to the machine base 1.

Rotatably mounted between the bearings 22 and 23, is a sleeve 25 to which is secured a sprocket 26 meshing with a chain 27 which in turn engages a sprocket 28 driven by the reduction gearing within the housing 2 through a horizontal shaft 29, bevel gears 30 and a vertical shaft 31 journaled in a bearing 32.

A plate 33 is interposed between the bottom of sleeve 25 and the bearing 22 to provide a thrust bearing for the sleeve 25.

A reciprocating spindle 34 has attached thereto a key 35 slidable within a keyway 36 extending the length of the sleeve 25 whereby the same will rotate the spindle 34 while being free to be reciprocated by a cam mechanism to be described. Bushings 37 mounted within the bearings 22 and 23 provide bearing surfaces for the spindle 34.

The spindle 34 is provided near the top thereof with an annular groove 38 rotatably receiving a flange 39 integral with a ring 40 bolted to a collar 41 having an aperture 42 in which is secured a pin 43 by a set screw 44. Thus the ring 40 will transmit a push-and-pull motion to the spindle 34 to reciprocate the same and allow the same to be rotated by the sprocketed sleeve 25.

The pin 43 is part of a cam yoke 45 guided by a guide rod 46 slidable in a bearing block 47 bolted to the support 24.

The cam yoke 45, and thereby the spindle 34 is reciprocated by a cam 48 rotatably mounted in a bearing 49 bolted to the support 24. The cam 48 is attached to a horizontal drive shaft 50 driven through bevel gears 51 by a vertical shaft 52 deriving its power from the reduction gearing within the housing 2. A bracket 53, which may be mounted in any convenient manner, additionally supports the shafts 50 and 52.

Thus, through the combined action of the cam 48 and the sprocket gearing, the spindle 34 is simultaneously rotated and reciprocated for a purpose to be described.

A cutting tool 54 is bolted to a plate 55 having a threaded stem 55' received within an adjusting nut 57 which in turn is threaded upon threaded part 56 of a plunger 58 slidable within the spindle 34, the travel of said plunger 58 being limited by a pin 59 fastened to the plunger 58 and extending through a slotted opening 60 in the spindle 34.

A compression spring 61 is mounted within the spindle 34 and has one end against an internal shoulder 62 in the spindle 34 and the other end against the adjusting nut 57. The spring 61 holds the milling tool 54 against the cartridge cup 15 with the proper pressure to obtain the desired cut. The adjusting nut 57 adjusts the effective combined length of the plunger 58 and tool 54 to control the amount of cut to be removed from various sized cups, set screws 57' locking the sleeve 57 to the threaded parts 55' and 56.

In operation of the machine, cartridge cups are placed upright in the work table slots by hand. The work table 6 is turned intermittently carrying the cups successively under the continuously rotating milling cutter 54. After a cup has been positioned under the cutter 51, the work table 6 is held while the cutter 54 is moved downwardly by the cam 48 to trim the cup end.

When the milling operation is completed, the cutter 54 is raised by the cam 48 and the work table 6 is stepped around to advance another cup under the cutter 54 for trimming and to remove the milled cup for discharge by gravity through an opening, not shown.

It is to be understood that while a preferred embodiment is shown and described, various changes in the shape, size, arrangement of parts may be resorted to without departing from the spirit of the invention and scope of the following claims.

I claim:

1. A tool mounting for use with a work processing machine comprising a yoke, a cam in said yoke and means for rotating it for reciprocating the yoke, means for guiding the yoke in its reciprocating movements, a hollow spindle connected to and reciprocated by said yoke, said spindle being rotatably connected with the yoke, a sleeve on said spindle and rotatable therewith, connections between the sleeve and the spindle constructed and arranged to permit a sliding movement between the spindle and sleeve, means for rotating the sleeve and consequently the spindle, a plunger slidable in the lower end of the spindle for attachment of a work engaging tool, a spring backing said plunger, a stem extending into said spindle threadedly connected with the plunger whereby said plunger may be adjusted relative to work pieces; and means for limiting the movement of the plunger in the spindle.

2. In a milling device, the combination of a plunger, a cutter tool secured thereto, a spindle slidably receiving said plunger, spring means coiled about said plunger and bearing against said spindle and said plunger for urging the latter axially of the former, means between said spindle and plunger for limiting relative axial movement between the same, a stationary bearing means, a sleeve having an axial keyway and rotatable upon said bearing means, key means slidable in said keyway and secured to said spindle whereby the same will rotate with, and move axially relative to said sleeve, means for rotating said sleeve and means, including a cam and a follower rotatable on but axially fixed with said spindle, to reciprocate said spindle simultaneously during rotation thereof.

3. In a milling device, the combination of a plunger, a cutter tool secured thereto, a spindle slidably receiving said plunger, spring means coiled about said plunger and bearing against said spindle and said plunger for urging the latter axially of the former, means between said spindle and plunger for limiting relative axial movement between the same, a stationary bearing means, a sleeve rotatable upon said bearing means, means securing said spindle for rotary movement with and axial movement relative to said sleeve, means for rotating said sleeve, and means, including a cam and a follower rotatable on but axially fixed with said spindle, to reciprocate said spindle simultaneously during rotation thereof.

HARVEY M. BRAUCHER.

REFERENCES CITED

The following references are of record in the file of this patent:

UNITED STATES PATENTS

| Number | Name | Date |
| --- | --- | --- |
| 281,138 | Richards | July 10, 1883 |
| 1,889,653 | Gorton | Nov. 29, 1932 |